(12) United States Patent
He et al.

(10) Patent No.: US 11,919,818 B2
(45) Date of Patent: Mar. 5, 2024

(54) RAPID SINTERING SYSTEM AND RAPID SINTERING METHOD

(71) Applicant: Liaoning Upcera Co., Ltd, Benxi (CN)

(72) Inventors: Lingling He, Benxi (CN); Wanting Xia, Benxi (CN); Ying Guo, Benxi (CN); Yingying Bai, Benxi (CN); Chengwei Han, Benxi (CN)

(73) Assignee: Liaoning Upcera Co., Ltd., Benxi (CN)

( * ) Notice: Subject to any disclaimer, the term of this patent is extended or adjusted under 35 U.S.C. 154(b) by 1345 days.

(21) Appl. No.: 16/346,092

(22) PCT Filed: Aug. 28, 2017

(86) PCT No.: PCT/CN2017/099293
§ 371 (c)(1),
(2) Date: Apr. 29, 2019

(87) PCT Pub. No.: WO2018/076919
PCT Pub. Date: May 3, 2018

(65) Prior Publication Data
US 2020/0055782 A1    Feb. 20, 2020

(30) Foreign Application Priority Data
Oct. 31, 2016 (CN) .......................... 201610930920.2

(51) Int. Cl.
*C04B 35/64* (2006.01)
*A61C 13/00* (2006.01)
(Continued)

(52) U.S. Cl.
CPC .......... *C04B 35/64* (2013.01); *A61C 13/0006* (2013.01); *A61C 13/083* (2013.01);
(Continued)

(58) Field of Classification Search
CPC ............. C04B 2235/66; F27B 17/0016; F27B 17/025; A61C 13/0006
See application file for complete search history.

(56) References Cited

U.S. PATENT DOCUMENTS 4,498,865 A * 2/1985 Schulmeyer ........... C23D 13/00
432/18
5,072,360 A 12/1991 Knorpp et al.
(Continued)

FOREIGN PATENT DOCUMENTS

CN        1076227 A      9/1993
CN      101423220 A      5/2009
(Continued)

OTHER PUBLICATIONS

Espacenet machine translation of DE19824497A1, 7 pages. (Year: 2023).*
(Continued)

*Primary Examiner* — Emmanuel S Luk
(74) *Attorney, Agent, or Firm* — PATTERSON + SHERIDAN, LLP; Steven H. VerSteeg

(57) ABSTRACT

A rapid sintering system and rapid sintering method, the rapid sintering system comprising: a furnace body (110) comprising a hearth (111) and a furnace mouth (112) that communicate with each other; a lifting device (120) arranged below the furnace mouth (112), comprising a support (122) and a sample stage (121), the sample stage (121) being disposed on the support (122); a temperature acquisition device (130), disposed on the sample stage (121); a control device (140), disposed outside of the hearth (111), electrically connected to the lifting device (120) and the temperature acquisition device (130) and used to control lifting of the lifting device (120) according to a temperature acquired by the temperature acquisition device (130) and a preset sintering condition; and a spacer (150), disposed at a (Continued)

first end of the lifting device (120), a first spacing being present between the spacer (150) and the sample stage (121), and the furnace mouth (112) is blocked by the spacer (150) when the rapid sintering system is in a loading or unloading work state. The rapid sintering method uses the rapid sintering system.

10 Claims, 4 Drawing Sheets

(51) Int. Cl.
    *A61C 13/083* (2006.01)
    *C04B 35/10* (2006.01)
    *C04B 35/185* (2006.01)
    *C04B 35/48* (2006.01)
    *F27B 17/02* (2006.01)
    *F27B 21/00* (2006.01)

(52) U.S. Cl.
    CPC ............ *C04B 35/10* (2013.01); *C04B 35/185* (2013.01); *C04B 35/48* (2013.01); *F27B 17/025* (2013.01); *F27B 21/00* (2013.01); *C04B 2235/3244* (2013.01); *C04B 2235/5224* (2013.01); *C04B 2235/5228* (2013.01); *C04B 2235/66* (2013.01); *C04B 2235/9669* (2013.01)

(56) References Cited

U.S. PATENT DOCUMENTS

| | | | | |
|---|---|---|---|---|
| 6,004,890 | A * | 12/1999 | Ueda | C09K 21/02 442/352 |
| 6,252,202 | B1 * | 6/2001 | Zychek | F27B 17/025 219/390 |
| 8,109,761 | B1 * | 2/2012 | Neal | F27B 17/025 432/189 |
| 8,461,489 | B2 * | 6/2013 | Miller | F27D 21/00 219/425 |
| 8,487,220 | B2 * | 7/2013 | Serrago | F27B 17/025 219/390 |
| 9,022,763 | B2 * | 5/2015 | Miller | A61C 13/20 264/16 |
| 10,939,980 | B2 * | 3/2021 | Fornoff | C04B 35/486 |
| 10,948,235 | B2 * | 3/2021 | Fornoff | F27D 99/0006 |
| 2009/0079101 | A1 * | 3/2009 | Laubersheimer | C04B 35/486 264/16 |
| 2013/0029281 | A1 | 1/2013 | Jussel et al. | |
| 2014/0027430 | A1 * | 1/2014 | Stoddard | F27D 3/1518 219/158 |
| 2015/0247672 | A1 | 9/2015 | Schmidt et al. | |
| 2019/0219336 | A1 * | 7/2019 | He | F27B 17/02 |
| 2020/0173722 | A1 * | 6/2020 | He | F27B 17/02 |

FOREIGN PATENT DOCUMENTS

| | | |
|---|---|---|
| CN | 203037063 U | 7/2013 |
| CN | 103759536 A | 4/2014 |
| CN | 103398581 B | 9/2014 |
| CN | 105466209 A | 4/2016 |
| CN | 105546985 A | 5/2016 |
| DE | 19824497 A1 | 12/1999 |
| EP | 3534097 A1 | 9/2019 |
| JP | H10-033564 A | 2/1998 |
| JP | H10-213376 A | 8/1998 |
| JP | H1176268 A | 3/1999 |
| JP | 2005195238 A | 7/2005 |
| JP | 2015-531048 A | 10/2015 |
| KR | 10-2008-0073084 A | 8/2008 |
| KR | 101179501 B1 | 9/2012 |

OTHER PUBLICATIONS

Extended European Search Report issued in corresponding European Patent Application No. 1786567.5, dated Aug. 19, 2019 (9 pages).

Office Action issued in corresponding Korean Patent Application No. 10-2019-7014871, dated Jan. 21, 2020 (12 dated).

International Search Report issued in corresponding International Patent Application No. PCT/CN2017/099293, dated Dec. 6, 2017 (4 pages).

* cited by examiner

RAPID SINTERING SYSTEM AND RAPID SINTERING METHOD

The present application claims the priority of Chinese Patent Application No. 201610930920.2, with the title of "Rapid sintering system and rapid sintering method", filed on Oct. 31, 2016 before the China National Intellectual Property Administration, which is incorporated herein by reference in its entirety.

FIELD OF THE INVENTION

The present application relates to the technical field of dental material preparation, and in particular to a rapid sintering system and a rapid sintering method.

BACKGROUND OF THE INVENTION

With the acceleration of pace of life and the emergence of chairside Computer Aided Design (CAD)/Computer Aided Manufacturing (CAM), in the current field of dental restoration, patients not only require dental restorations to be well qualified, but also hope to shorten the time spent on dental treatment.

Ceramic materials such as zirconia have good mechanical properties, chemical stability, biosafety, and aesthetic properties close to human natural teeth, therefore become dental restoration materials widely used in clinical treatment. However, a restoration prepared from a ceramic material needs to be sintered by a heat treatment equipment such as a sintering furnace after being processed by a cutting device such as CAD/CAM. In the prior art, a heat treatment equipment sets a corresponding sintering temperature profile according to the sintering temperature curve of the material. At present, the hearth of the sintering furnace is mostly heated by a silicon molybdenum rod or a silicon carbon rod heating element. And the control device changes the temperature of the heating element by controlling the voltage and current, thereby changing the temperature in the hearth to control the sintering temperature of the sample (product) to be sintered, while the temperature adjustment takes a long time. For example, a temperature rise of about 20 degrees (Celsius temperature)/minute at most can be achieved by the sintering furnace with an existing silicon molybdenum rod or a silicon carbon heating element, so that it takes at least 80 minutes from the time at which the sample to be sintered (here a zirconia ceramic dental prosthesis is taken as an example) is placed into the furnace to the time at which the sintering of zirconia ceramic dental prosthesis is completed. And the sintering efficiency of the product is low. In summary, the products in the prior art have a slow sintering rate and a low sintering efficiency.

SUMMARY OF THE INVENTION

The present application provides a rapid sintering system and a rapid sintering method to achieve rapid sintering of a sample to be sintered and to improve the sintering efficiency of products. The specific technical solutions are as follows:

In a first aspect, examples of the present application provide a rapid sintering system comprising a furnace body and a lifting device, the furnace body comprises a hearth and a furnace mouth that communicate with each other, the lifting device comprises a support and a sample stage disposed on the support, wherein the rapid sintering system further comprises:

a temperature acquisition device, disposed on the sample stage;

a control device, disposed outside the hearth, and electrically connected to the lifting device and the temperature acquisition device, and configured to control the elevating and descending of the lifting device according to a temperature acquired by the temperature acquisition device and preset sintering conditions, wherein, the preset sintering conditions include: a sintering temperature, a heating rate, and a holding time; and a spacer, disposed at a first end of the lifting device, there is a first space between the spacer and the sample stage, when the rapid sintering system is in a loading or unloading work state, the furnace mouth is blocked by the spacer, wherein the first end is an end of the lifting device adjacent to the sample stage.

Optionally, the spacer comprises: a plug and a support rod, wherein the lower end portion of the support rod is fixedly coupled to the lifting device, the upper end portion of the support rod is fixedly coupled to the plug, and the furnace mouth is blocked by the plug of the spacer.

Optionally, the spacer is a structure made of a high temperature resistant material, in particular a structure made of alumina ceramic fiber or a structure made of polycrystalline mullite fiber.

Optionally, the temperature acquisition device is: a thermocouple, a semiconductor thermometer or a solid thermometer.

Optionally, the control device is: a single board computer, a single chip computer or a computer.

In a second aspect, examples of the present application provide a rapid sintering method performed by using the rapid sintering system described above, including:

(a) disposing a sample to be sintered on the sample stage when a temperature in the hearth reaches the highest temperature required for sintering the sample to be sintered;

(b) acquiring a temperature at the sample to be sintered in real time as a real-time sintering temperature by the temperature acquisition device, and feeding back the real-time sintering temperature to the control device, wherein the sample to be sintered is disposed on the sample stage; and (c) controlling the elevating and descending of the lifting device by the control device according to preset sintering conditions obtained in advance and the real-time sintering temperature, so that the real-time sintering temperature of the sample to be sintered is consistent with the preset sintering conditions, and completing the sintering of the sample to be sintered, wherein the preset sintering conditions include: a sintering temperature, a heating rate, and a holding time.

Optionally, the step (a) comprises:

the temperature in the hearth is maintained constant when the temperature in the hearth reaches the highest temperature required for sintering the sample to be sintered; and the sample to be sintered is disposed on the sample stage.

Optionally, the step (c) comprises:

(c1) determining the temperature curve required for sintering the sample to be sintered, which is used as a preset temperature curve, according to the preset sintering conditions obtained in advance; and (c2) controlling the elevating and descending of the lifting device by the control device according to the preset temperature curve and the real-time sintering temperature, so that the temperature curve of the real-time sintering temperature is consistent with the preset temperature curve, and completing the sintering of the sample to be sintered.

Optionally, the step (c2) comprises:

determining a processing time slot by the control device, wherein the processing time slot is a preset unit time for the elevating and descending of the lifting device;

comparing the real-time sintering temperature with the preset temperature curve by the control device during the sintering process to determine a required temperature at the sample to be sintered at the end of the processing time slot, and setting the required temperature at the sample to be sintered as a target temperature; and controlling the elevating and descending of the lifting device by the control device, so that the temperature at the sample to be sintered reaches the target temperature after the processing time slot, and maintaining the target temperature until sintering is completed.

It can be seen from the above technical solutions that the rapid sintering system and the rapid sintering method provided by the examples of the present application can accomplish rapid heating of the sample to be sintered with the temperature gradient of the hearth and the furnace mouth by controlling the position of the sample to be sintered, thereby the sintering time for the sample to be sintered can be reduced to achieve rapid sintering of the sample to be sintered and to improve the sintering efficiency of products. Of course, it is not necessary to achieve all of the advantages described above at the same time by implementing any one of the products or methods of the present application.

DESCRIPTION OF THE DRAWINGS

In order to illustrate the technical solutions of the examples of the present application and the prior art more clearly, the following drawings used in the examples and the prior art will be briefly introduced. Obviously, the drawings in the following description are only some examples of the present application, and those skilled in the art can obtain other drawings according to these drawings without any inventive efforts.

DETAILED DESCRIPTION OF THE INVENTION

In order to make the objects, technical solutions, and advantages of the present application more clear and comprehensible, the present application will be further described in detail below with reference to the accompanying drawings and examples. It is apparent that the described examples are only a part of the examples of the present application, not all of them. All other examples obtained by the ordinary skilled person in the art based on the examples of the present application without making inventive efforts fall into the scope of the present application.

It should be noted that "loading or unloading work state" as used herein refers to the working condition of the rapid sintering system when the lifting device of the rapid sintering system is lowered to the loading or unloading position; "sintering work state" refers to the working condition of the rapid sintering system when the lifting device of the rapid sintering system is raised to the sintering position. The "upper end" refers to the end of the rapid sintering system adjacent to the hearth, and the "lower end" is the end of the rapid sintering system adjacent to the support.

Figure 1:
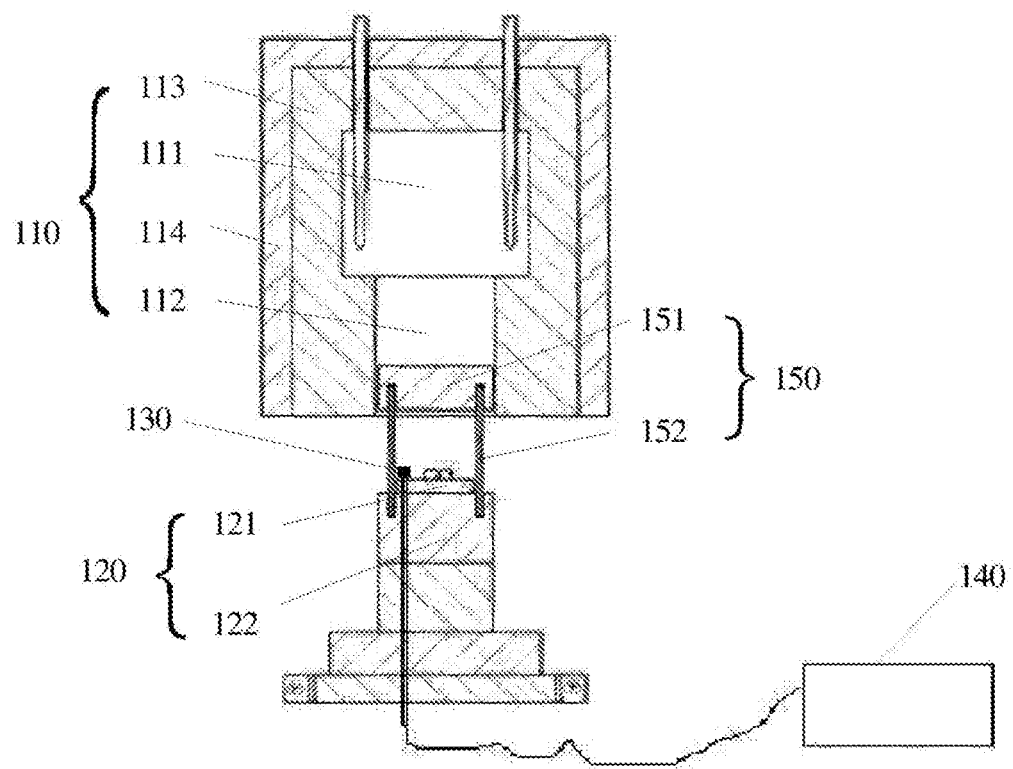
FIG. 1 is a schematic structural view of the rapid sintering system according to the examples of the present application.

Referring to FIG. 1, examples of the present application provide a rapid sintering system, and the structure thereof specifically includes:

The furnace body 110, which includes a hearth 111 and a furnace mouth 112 that communicate with each other.

Of course, the furnace body 110 of the rapid sintering system further includes a heating element (not shown in the figure), a heat insulating layer 113, and a protective housing 114, wherein the heating element is disposed on the hearth 111, and the heat insulating layer 113 is disposed outside the heating element and the hearth 111, the protective housing 114 is disposed outside the heat insulating layer 113. The heat insulating layer 113 can reduce heat exchange between the hearth 111 and the outside when sintering the sample to be sintered to ensure the temperature in the hearth 111. The heating element of the examples of the present application is a silicon molybdenum rod heating element, a silicon carbon rod heating element, or any heating element that can be applied in a hearth to accomplish heat-generating function.

The heat insulating layer 113 and the protective housing 114 may be made of high temperature resistant light refractory materials. For example, the protective housing 114 may be made of alumina ceramic fiber refractory material, and the heat insulating layer 113 may be made of polycrystalline mullite fiber refractory material. The material of the protective housing 114 and the heat insulating layer 113 is not specifically limited in the examples of the present application.

The lifting device 120 is disposed at the end of the furnace body 110 adjacent to the furnace mouth 112. The lifting device 120 includes a support 122 and a sample stage 121, and the sample stage 121 is disposed on the support 122.

The lifting device 120 further includes a lifting motor (not shown in the figure) disposed on the furnace body 110 or on the support 122. Specifically, the lifting motor includes an electric motor or a hydraulic machine.

The temperature acquisition device 130 is disposed on the sample stage 121.

The temperature acquisition device 130 is disposed on the sample stage 121 at the position adjacent to the sample to be sintered, and there is a second interval between the temperature acquisition device 130 and the sample to be sintered, the space formed by the second interval can ensure the normal sintering process of the sample to be sintered, without affected by the temperature acquisition device 130, and the temperature acquired by the temperature acquisition device 130 is maximally close to the real sintering temperature at the sample to be sintered. For example, the temperature acquisition device 130 can be a temperature sensor.

The control device 140 is disposed outside the hearth 111 and electrically connected to the lifting device 120 and the temperature acquisition device 130 for determining the temperature acquired by the temperature acquisition device 130, and controlling the elevating and descending of the lifting device 120 according to the temperature and the preset sintering conditions.

Wherein, the preset sintering conditions include: sintering temperature, heating rate and holding time.

Figure 2:
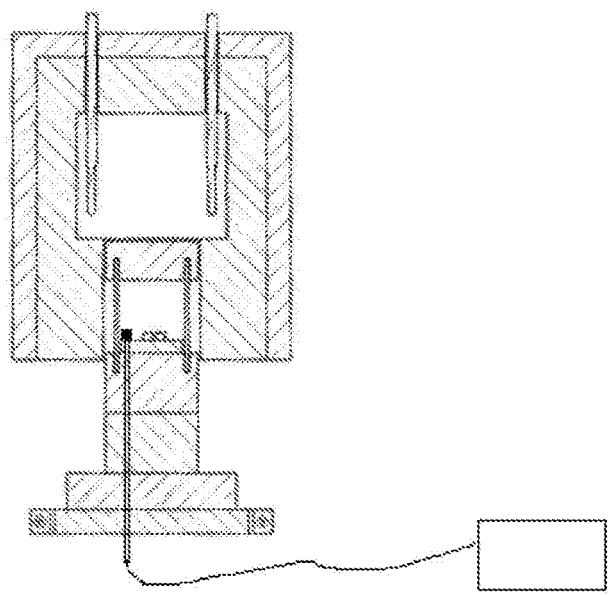
FIG. 2 is a schematic view of the sample stage of the lifting device of the rapid sintering system according to the examples of the present application, wherein the sample stage is at the furnace mouth.
Figure 3:
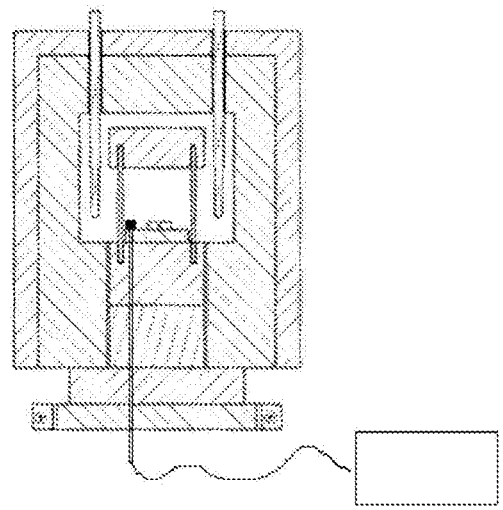
FIG. 3 is a schematic view of the sample stage of the lifting device of the rapid sintering system according to the examples of the present application, wherein the sample stage is in the hearth.

The control device 140 is disposed outside the furnace body 110, on the protective housing 114 or at any position convenient for operating the control device 140, and it is electrically connected to the lifting device 120 and the temperature acquisition device 130. Of course, they can also be connected by electric field coupling connection or any connection mode that the control device 140 transmits a control signal to the lifting device 120, and the control device 140 acquires a signal from the temperature acquisition device 130. The control device 140 acquires the real-time sintering temperature transmitted by the temperature acquisition device 130 (the real-time sintering temperature is acquired by the temperature acquisition device 130 in real time), and controls the elevating and descending of the lifting device 120 according to the real-time sintering temperature and the preset sintering conditions to lift the sample stage 121 to the furnace mouth 112 (see FIG. 2) or into the hearth 111 (see FIG. 3). The control device 140 can also be electrically connected to the furnace body 110, specifically to the heating element of the furnace body 110 for controlling the temperature of the heating element.

The spacer 150 is disposed at the first end of the lifting device 120, and there is a first interval between the spacer 150 and the sample stage 121. When the rapid sintering system is in the loading or unloading work state, the furnace mouth 112 is blocked by the spacer 150, wherein the first end is the end of the lifting device 120 adjacent to the sample stage 121.

In the rapid sintering system of the examples of the present application, the temperature gradient is increased from the furnace mouth 112 to the hearth 111, and there is a first interval between the spacer 150 and the sample stage 121, the space formed by the first interval is used to ensure that the spacer 150 does not affect the installation of the sample to be sintered on the sample stage 121, and minimizes the influence to real-time sintering temperature at the sample to be sintered by the temperature at temperature gradients other than the temperature gradient at the sample to be sintered. The contact between the spacer 150 and the furnace mouth 112 should be tight, that is, the spacer 150 and the furnace mouth 112 can be in a seamless contact. And it will not affect the spacer 150 to slide up and down in the furnace mouth 112, so that the spacer 150 can maintain the temperature in the hearth 111 when the furnace mouth 112 is blocked by the spacer 150, and can prevent the temperature at the furnace mouth 112 from dropping too fast, reduce the heat exchange between the furnace mouth 112 or the hearth 111 and the outside, reduce the pressure of the heating element for heat preservation and heating, and also can prevent the direct thermal radiation of high temperature in the hearth 111 to the sample to be sintered, while increasing the service life of the rapid sintering system.

The rapid sintering system provided by the examples of the present application can accomplish rapid heating of the sample to be sintered with the temperature gradient of the hearth and the furnace mouth by controlling the position of the sample to be sintered, thereby the sintering time for sintering the sample to be sintered is reduced to achieve rapid sintering of a sample to be sintered and to improve the sintering efficiency of the product.

Optionally, in the rapid sintering system of the examples of the present application, the spacer 150 includes: a plug 151 and a support rod 152. The lower end portion of the support rod 152 is fixedly coupled to the lifting device 120, and the upper end portion of the support rod 152 is fixedly coupled to the plug 151. The furnace mouth is blocked by the spacer 150 through the plug 151.

The spacer 150 includes a plug 151 and a support rod 152. One end of the support rod 152 is disposed on the plug 151, and the other end of the support rod 152 is disposed on the lifting device 120. The number of the support rods 152 is one, two or more. Of course, the support rod 152 can also be replaced with a support body. In the spacer 150, the lower surface of the support body is fixedly coupled to the lifting device 120, and the upper surface of the support body is fixedly coupled to the plug 151, and the number of the support bodies is one or more than one. When the number of the support bodies is more than one, there should be intervals between the support bodies to ensure heat exchange between the hearth or the furnace mouth and the sample to be sintered.

Through the examples of the present application, a specific method of disposing the spacer 150 is provided to ensure the first interval between the spacer 150 and the sample stage 121.

Optionally, in the rapid sintering system of the examples of the present application, the spacer 150 has a structure made of high temperature resistant materials, specifically a structure made of alumina ceramic fiber or a structure made of polycrystalline mullite fiber.

Since in the examples of the present application, the spacer 150 will enter the hearth 111, at that time the temperature at the spacer 150 will reach 1600° C. or higher. Therefore, the spacer 150 is made of high temperature resistant materials. Specifically, the spacer 150 may be made of alumina ceramic fiber or made of polycrystalline mullite fiber. Of course, since the spacer 150 also has the effect on preventing sudden temperature drop at the furnace mouth 112, the thermal insulation properties of the material selected for the spacer 150 may also be considered.

Through the examples of the present application, the spacer 150 is made of high temperature resistant materials, which improves the service life of the spacer 150 in a high temperature environment.

Optionally, in the rapid sintering system of the examples of the present application, the temperature acquisition device 130 is specifically: a thermocouple, a semiconductor thermometer, or a solid thermometer.

The temperature acquisition device 130 is configured to acquire the real-time sintering temperature at the sample to be sintered. Since the sintering temperature at the sample to be sintered is very high (taking zirconia ceramic as an example, the highest sintering temperature is about 1600° C.), the temperature acquisition device 130 must be capable of working normally in a high temperature environment. The temperature acquisition device 130 is any temperature acquisition device capable of acquiring temperature at high temperature, and may be, for example, a thermocouple, a semiconductor thermometer, or a solid thermometer. For example, when the temperature acquisition device 130 is a thermocouple, which generates different thermo electromotive force at different temperatures, the control device 140 acquires the thermo electromotive force signal generated by the thermocouple, and the real-time sintering temperature is determined by the thermo electromotive force signal. When the temperature acquisition device 130 is a semiconductor thermometer, since the resistance of the semiconductor thermometer is different at different temperatures when a voltage is applied across the semiconductor thermometer, which causes a current change, the control device 140 obtains the current output by the semiconductor thermometer, and the real-time sintering temperature is determined through the current. When the temperature acquisition device 130 is a solid thermometer, the solid thermometer is connected to a gear, and the gear is connected to a sliding piece of the sliding rheostat. Since the volume of the solid thermometer is different at different temperatures when a voltage is applied across the sliding rheostat, the change of the volume of the solid thermometer will drive the rotation of gear. The rotation of the gear causes the change of the resistance of the sliding rheostat, which affects the current of the sliding rheostat. The control device 140 obtains the current through the sliding rheostat and the real-time sintering temperature is determined by the current.

In the examples of the present application, the temperature acquisition device 130 can also work normally at high temperature, which ensures normal acquisition of the real-time sintering temperature. It has a good high temperature resistance and long service life at high temperature.

The control device 140 is configured to acquire a real-time sintering temperature, and control the elevating and descending of the lifting device 120 according to the real-time sintering temperature and the preset temperature curve. In the examples of the present application, information processing capability is required for the control device 140. The control device 140 may be any device having the information processing capability that can be applied to the examples of the present application, and may be specifically a single board computer, a single chip computer or a computer.

Figure 4:
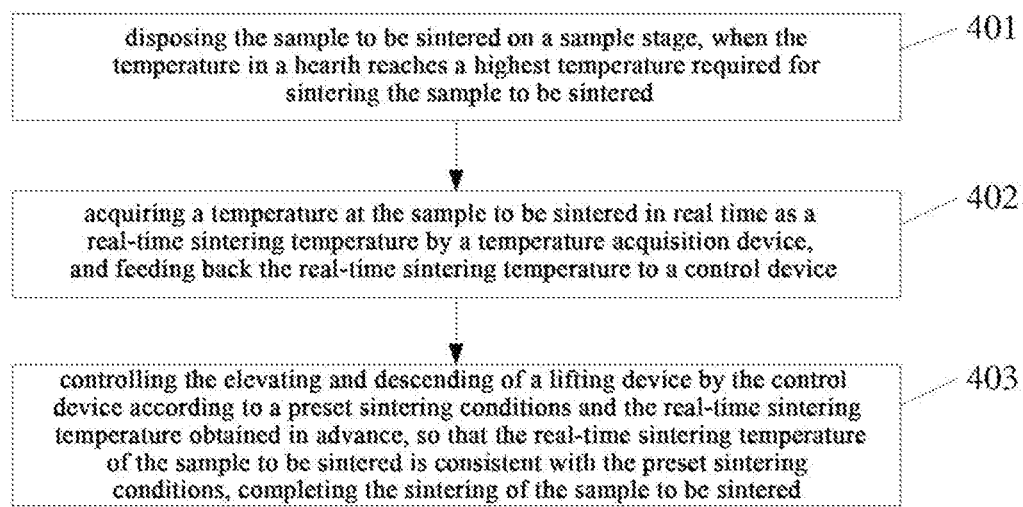
FIG. 4 is a schematic flow chart of the rapid sintering system according to the examples of the present application.

Referring to FIG. 4, which is a schematic flow chart of a rapid sintering method, comprising the following steps:

In step 401, disposing the sample to be sintered on the sample stage, when the temperature in the hearth reaches the highest temperature required for sintering the sample to be sintered.

Heating the temperature in the hearth in advance to the highest temperature required for sintering of the sample to be sintered according to preset sintering conditions, before disposing the sample to be sintered.

In step 402, acquiring the temperature at the sample to be sintered as a real-time sintering temperature in real time by the temperature acquisition device, and feeding back the real-time sintering temperature to the control device.

The sample to be sintered is disposed on the sample stage.

The temperature acquisition device is any temperature acquisition device capable of acquiring temperature at high temperatures, and may be, for example, a thermocouple, a semiconductor thermometer, or a solid thermometer. For example, when the temperature acquisition device is a thermocouple, the thermo electromotive force generated by the thermocouple is different at different temperatures, and the temperature acquisition device feeds back the thermal electromotive force to the control device to accomplish the feedback of the real-time sintering temperature to the control device; of course, the temperature acquisition device can also convert thermo electromotive force to other signals that the control device can identify, and send the signals to the control device.

When the temperature acquisition device is a semiconductor thermometer, since the resistance is different at different temperatures when a voltage is applied across the semiconductor thermometer, which causes a current change, the temperature acquisition device accomplishes the feedback of the real-time sintering temperature to the control device by feeding back the current to the control device; of course, the temperature acquisition device can also convert the current to other signals that the control device can identify, and send the signals to the control device.

When the temperature acquisition device is a solid thermometer, the solid thermometer is connected to a gear. The gear is connected to the sliding piece of the sliding rheostat. Since the volume of the solid thermometer is different at different temperatures when a voltage is applied across the sliding rheostat, the change of the volume of the solid thermometer will drive the rotation of the gear. The rotation of the gear will cause the change of the resistance of the sliding rheostat, which in turn affects the current of the sliding rheostat, and the temperature acquisition device accomplishes feedback of the real-time sintering temperature to the control device by feeding back the current to the control device; of course, the temperature acquisition device can also convert the current into other signals that the control device can identify and send the signals to the control device.

After the sample to be sintered is disposed on the sample stage, the lifting device is controlled to elevate, and the temperature at the sample to be sintered is acquired as the real-time sintering temperature in real time by the temperature acquisition device disposed on the sample stage. The real-time sintering temperature is fed back to the control device for controlling the elevating and descending of the lifting device.

In step 403, controlling the elevating and descending of the lifting device by the control device according to the preset sintering conditions obtained in advance and the real-time sintering temperature, so that the real-time sintering temperature of the sample to be sintered is consistent with the preset sintering conditions, completing the sintering of the sample to be sintered.

The preset sintering conditions include: sintering temperature, heating rate and holding time.

The sintering of the sample to be sintered has a special temperature requirement, which is specifically related to the relationship between the sintering time and the sintering temperature. Before sintering the sample to be sintered, it is necessary to obtain the temperature required for sintering the sample to be sintered, the heating rate of the sample to be sintered, and the sintering time corresponding to the sintering temperature required for sintering the sample to be sintered as the preset sintering conditions. According to the preset sintering conditions obtained in advance and the real-time sintering temperature, the elevating and descending of the lifting device is controlled by the control device so that the real-time sintering temperature is consistent with the preset sintering conditions.

When it is not possible to complete the sintering of all the samples to be sintered at one time, after the sintering of a batch of the samples to be sintered is completed, the batch of the samples to be sintered is taken out for the next operation, and another batch of samples to be sintered can be disposed on the sample stage and sintered. In the current field of dental restoration, when the zirconia ceramic dental prosthesis is sintered, the maximum sintering temperature is about 1600° C. Therefore, after the sintering of a batch of products is completed, the sintering of the next batch of products can be directly performed. For example, after the sintering of the zirconia ceramic dental crown is completed, the temperature in the hearth of the rapid sintering system is maintained constant, and the zirconia ceramic three-unit bridge is disposed on the sample stage and sintered.

Through the examples of the present application, rapid heating of the sample to be sintered is accomplished with the temperature gradient of the hearth and the furnace mouth by controlled position of the sample to be sintered, thereby the sintering time for sintering the sample to be sintered is reduced to achieve rapid sintering of a sample to be sintered and to improve the sintering efficiency of the product.

Optionally, in the rapid sintering method of the examples of the present application, step 401 includes:

the temperature in the hearth is maintained constant, when the temperature in the hearth reaches the highest temperature required for sintering the sample to be sintered.

The sample to be sintered is disposed on the sample stage.

Before sintering the sample to be sintered by using the rapid sintering system of the examples of the present application, it is necessary to raise the temperature in the hearth of the rapid sintering system to the highest temperature required for sintering of the sample to be sintered (the highest temperature can be determined according to preset sintering conditions). The temperature in the hearth is maintained constant, when the temperature in the hearth reaches the highest temperature required for sintering the sample to be sintered.

Through the examples of the present application, the temperature in the hearth is maintained constant, when the temperature in the hearth reaches the highest temperature required for sintering the sample to be sintered. It can prevent the normal sintering of the sample to be sintered from being affected by the excessive high temperature in the hearth. At the same time, the energy consumption generated by the thermal preservation process of the hearth is lower than the energy consumption generated by the heating process, which reduces the energy consumption of the rapid sintering system. The consumption of the heating element due to excessive high temperature is prevented and the service life of the rapid sintering system is improved.

Optionally, in the rapid sintering method of the examples of the present application, step 403 includes:

a first step, determining the temperature curve required for sintering the sample to be sintered as a preset temperature curve according to the preset sintering conditions obtained in advance;

a second step, controlling the elevating and descending of the lifting device by the control device according to the preset temperature curve and the real-time sintering temperature, so that the temperature curve of the real-time sintering temperature is consistent with the preset temperature curve, completing the sintering of the sample to be sintered.

In the examples of the present application, in order to explain how to control the temperature of the sample to be sintered more specifically, the preset sintering conditions are converted into a preset temperature curve. According to the preset temperature curve, the elevating and descending of the lifting device is controlled, so that the temperature curve formed by the real-time sintering temperature is consistent with the preset temperature curve.

Through the examples of the present application, a specific method for controlling the temperature at the sample to be sintered is provided, which achieves rapid sintering of the sample to be sintered.

Optionally, in the rapid sintering method of the examples of the present application, controlling the elevating and descending of the lifting device by the control device according to the preset temperature curve and the real-time sintering temperature, so that the temperature curve of the real-time sintering temperature is consistent with the preset temperature curve, and completing the sintering of the sample to be sintered, wherein the method includes following steps:

a first step, determining a processing time slot by the control device, wherein the processing time slot is a preset unit time for elevating and descending the lifting device.

a second step, comparing the real-time sintering temperature with the preset temperature curve by the control device during the sintering process to determine a required temperature at the sample to be sintered at the end of the processing time slot, and setting the required temperature at the sample to be sintered as a target temperature.

a third step, controlling the elevating and descending of the lifting device by the control device, so that the temperature at the sample to be sintered reaches the target temperature after the processing time slot, and maintaining the target temperature until sintering is completed.

The processing time slot may be set in advance according to the sintering demand and the delay of the system, or may be determined by the rapid sintering system according to an instruction input by the user. The processing time slot is a unit time for controlling the elevating and descending of the lifting device, for example, 0.1 second or longer, 0.5 second or longer, or 1 second or longer. Throughout the sintering process, the overall sintering time is divided into a plurality of processing time slots, and the target temperatures of each processing time slot are determined by the control device according to the real-time sintering temperature and the preset temperature curve.

During the heating process, when a processing time slot starts, the highest temperature required for sintering the sample to be sintered in the current processing time slot is determined (the highest temperature may also be determined in advance) as the highest target temperature by the control device according to the real-time sintering temperature and the preset temperature curve. The elevating and descending of the lifting device is controlled by the control device so that the temperature at the sample to be sintered (real-time sintering temperature) reaches the highest target temperature after the processing time slot and is maintained until the heating process is completed.

During the cooling process, when a processing time slot starts, the lowest temperature required for sintering the sample to be sintered in the current processing time slot is determined (the lowest temperature may also be determined in advance) as the lowest target temperature by the control device according to the real-time sintering temperature and the preset temperature curve. The elevating and descending of the lifting device is controlled by the control device so that the temperature at the sample to be sintered reaches the lowest target temperature after the processing time slot and is maintained until the cooling process is completed.

For reasons such as system error, for example, in the first processing time slot, if the temperature of the sample to be sintered has reached the first target temperature before the end of the first processing time slot, the lifting device is controlled by the control device to stop elevating and descending until the next processing time slot begins. If the first processing time slot has ended and the temperature at the sample to be sintered has not reached the first target temperature, the elevating and descending of the lifting device is controlled by the control device (the elevating and descending rate may be increased according to the difference between the temperature at the sample to be sintered by the end of the first processing time slot and the first target temperature) in the second processing time slot, so that the temperature at the sample to be sintered reaches the second target temperature. The first processing time slot is any one of the processing time slots; the first target temperature is the target temperature corresponding to the first processing time slot; the second processing time slot is the next processing time slot following the first processing time slot; and the second target temperature is the target temperature corresponding to the second processing time slot.

It can be seen that in the examples of the present application, if the processing time slot is smaller, the temperature curve formed by the real-time sintering temperature will be smoother and closer to the preset temperature curve. The temperature at the sample to be sintered can be more accurately controlled by setting the processing time slot, which improves the quality of the sintering of the sample to be sintered.

Figure 5:
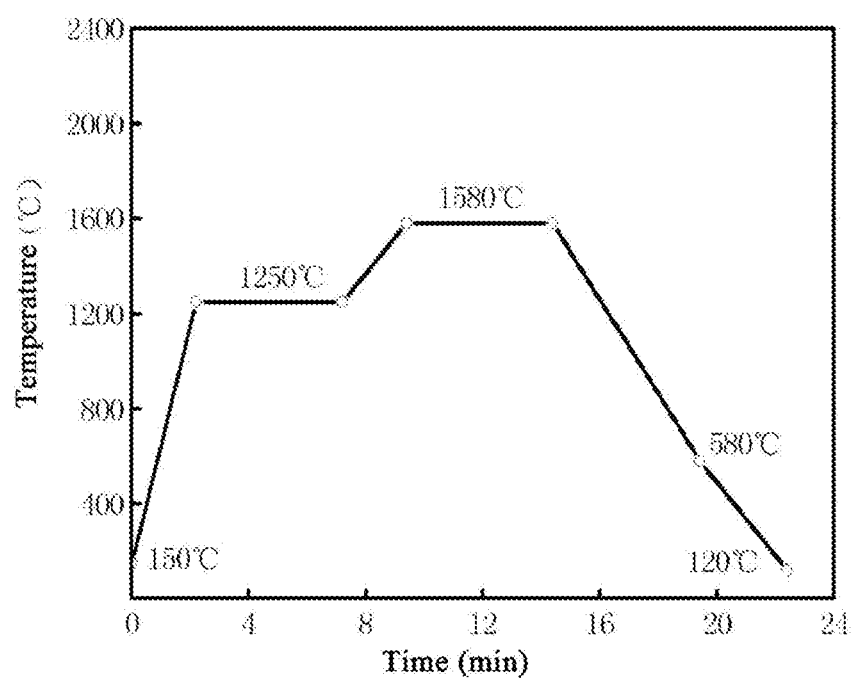
FIG. 5 is the preset temperature curve for sintering zirconia ceramic dental crown by using the rapid sintering system of the examples of the present application.

Referring to FIG. 5, FIG. 5 is the preset temperature curve for sintering zirconia ceramic dental crown by using the rapid sintering system of the examples of the present application.

The highest temperature required for sintering the zirconia ceramic dental crown is determined according to obtained preset sintering conditions. According to the highest temperature, the temperature in the hearth of the rapid sintering system is heated to 1250° C.-1650° C. in advance, for example, it may be 1250° C., 1300° C., 1400° C., 1500° C., 1600° C. or 1650° C., etc. When the temperature in the hearth is 1250° C.-1650° C., for example, it may be 1250° C., 1300° C., 1400° C., 1500° C., 1600° C. or 1650° C., etc., the zirconia ceramic dental crown to be sintered is disposed on the sample stage, and the real-time sintering temperature acquired by the temperature acquisition device (which is set as an thermocouple) at this time is 150° C. According to the preset sintering conditions, the control device controls the elevating and descending of the lifting device to start sintering.

Firstly, the control device controls the lifting device to start elevating, so that the temperature at the zirconia ceramic dental crown is increased at a rate of 500° C./min, and the temperature at the zirconia ceramic dental crown is raised to 1250° C. When the temperature at the zirconia ceramic dental crown reaches 1250° C., the real-time sintering temperature, which is obtained by the control device, fed back by the thermocouple is 1250° C., the control device controls the lifting device to stop elevating, so that the zirconia ceramic dental crown is sintered in the environment of 1250° C. for 5 minutes. Then, the control device controls the lifting device to continue elevating, so that the temperature at the zirconia ceramic dental crown is increased at a rate of 150° C./min, and the temperature at the zirconia ceramic dental crown is raised to 1580° C. When the real-time sintering temperature, which is obtained by the control device, fed back by the thermocouple is 1580° C., the lifting device is controlled to stop elevating, so that the zirconia ceramic dental crown is sintered in the environment of 1580° C. for 5 minutes. Finally, the control device controls the lifting device to start descending, so that the temperature at the zirconia ceramic dental crown is dropped at a rate of 200° C./min. After 5 minutes, the sample stage is lowered to the bottom, and the temperature, which is obtained by the control device, fed back by the thermocouple is 600° C. After cooling for 3 minutes with the assistance of the fan around the sample stage, the control device acquires the temperature around the zirconia ceramic dental crown fed back by the thermocouple as 120° C., and the sintered zirconia ceramic dental crown is taken down for the next step.

In order to apply the zirconia ceramic restoration to the chairside CAD/CAM system, it is necessary to reduce the sintering time of the zirconia ceramic restoration to less than 40 minutes, which is difficult to achieve by the existing sintering furnace. In the examples of the present application, it takes about 20 minutes from the time at which the zirconia ceramic dental crown is disposed on the sample stage to the time at which the sintering ends; and it takes 23 minutes from the time at which the zirconia ceramic dental crown is disposed on the sample stage to the time at which the next step begins to be operated. The sintering time of the zirconia ceramic dental crown is reduced, and the sintering efficiency of the zirconia ceramic dental crown is improved.

Figure 6:
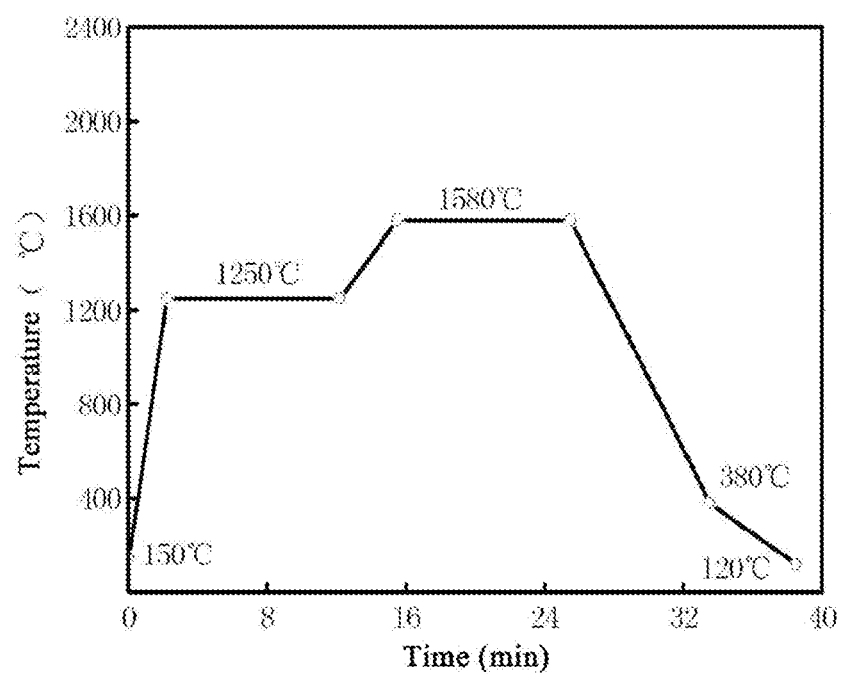
FIG. 6 is the preset temperature curve for sintering a three-unit bridge of zirconia ceramics by using the rapid sintering system of the examples of the present application.

Referring to FIG. 6, FIG. 6 is the preset temperature curve for sintering a three-unit bridge of zirconia ceramics by using the rapid sintering system of the examples of the present application.

The highest temperature required for sintering the zirconia ceramic three-unit bridge is determined according to obtained preset sintering conditions. According to the highest temperature, the temperature in the hearth of the rapid sintering system is heated to 1250° C.-1650° C. in advance, for example, it may be 1250° C., 1300° C., 1400° C., 1500° C., 1600° C. or 1650° C., etc. When the temperature in the hearth is 1250° C.-1650° C., for example, it may be 1250° C., 1300° C., 1400° C., 1500° C., 1600° C. or 1650° C., etc., the zirconia ceramic three-unit bridge to be sintered is disposed on the sample stage, and the real-time sintering temperature at this time acquired by the thermocouple is 150° C. According to the preset sintering condition, the control device controls the elevating and descending of the lifting device to start sintering.

Firstly, the control device controls the lifting device to start elevating, so that the temperature at the zirconia ceramic three-unit bridge is increased at a rate of 500° C./min, and the temperature at the zirconia ceramic three-unit bridge is raised to 1250° C. When the temperature at the zirconia ceramic three-unit bridge reaches 1250° C., the real-time sintering temperature, which is obtained by the control device, fed back by the thermocouple is 1250° C., the control device controls the lifting device to stop elevating, so that the zirconia ceramic three-unit bridge is sintered in the environment of 1250° C. for 10 minutes. Then, the control device controls the lifting device to continue elevating, so that the temperature at the zirconia ceramic three-unit bridge is increased at a rate of 100° C./min, and the temperature at the zirconia ceramic three-unit bridge is raised to 1580° C. When the temperature at the zirconia ceramic three-unit bridge reaches 1580° C., the real-time sintering temperature, which is obtained by the control device, fed back by the thermocouple is 1580° C., the control device controls the lifting device to stop elevating, so that the zirconia ceramic three-unit bridge is sintered in the environment of 1580° C. for 10 minutes. Finally, the control device controls the lifting device to start descending, so that the temperature at the three-unit bridge of the zirconia ceramic is cooled at a rate of 150° C./min. After 8 minutes, the sample stage is lowered to the bottom, and the temperature at the zirconia ceramic three-unit bridge, which is obtained by the control device, fed back by the thermocouple is 600° C. (when the zirconia ceramic three-unit bridge is in the hearth and the furnace mouth, the cooling rate is limited, which causes errors). After cooling for 5 minutes with the assistance of the fan around the sample stage, the control device acquires the temperature around the zirconia ceramic three-unit bridge fed back by the thermocouple as 120° C., and the sintered zirconia ceramic three-unit bridge is taken down for the next step.

In order to apply the zirconia ceramic restoration to the chairside CAD/CAM system, it is necessary to reduce the sintering time of the zirconia ceramic restoration to less than 40 minutes, which is difficult to achieve by the existing sintering furnace. In the examples of the present application, it takes about 33 minutes from the time at which the zirconia ceramic three-unit bridge is disposed on the sample stage to the time at which the sintering ends; and it takes 38 minutes from the time at which the zirconia ceramic three-unit bridge is disposed on the sample stage to the time at which the next step begins to be operated. The sintering time of the zirconia ceramic three-unit bridge is reduced, and the sintering efficiency of the zirconia ceramic three-unit bridge is improved.

It should be noted that, in this context, relational terms such as first and second are used merely to distinguish one entity or operation from another entity or operation, and do not necessarily require or imply any such actual relationship or order between these entities or operations. Furthermore, the term "comprise" or "include" or any other variations is intended to encompass a non-exclusive inclusion, such that process, method, article, or device that comprises a plurality of elements includes not only those elements but also other elements that are not explicitly listed, or elements that are inherent to such process, method, article, or device. An element that is defined by the phrase "comprising a . . . " does not exclude the presence of additional equivalent elements in the process, method, article, or device that comprises the element.

The various examples in the present specification are described in a related manner, and the same or similar parts between the various examples may be referred to each other. Each example focuses on the differences from the other examples.

The above description is only the preferred examples of the present application, and is not intended to limit the scope of the present application. Any modifications, equivalent substitutions, improvements and the like made within the spirit and principles of the present application are included in the scope of the present application.

The invention claimed is:

1. A rapid sintering system comprising a furnace body and a lifting device, wherein the furnace body comprises a hearth and a furnace mouth that communicate with each other, the lifting device comprises a support and a sample stage disposed on the support, and wherein the rapid sintering system further comprises:
 a temperature acquisition device, disposed on the sample stage;
 a control device, disposed outside the hearth, electrically connected to the lifting device and the temperature acquisition device, and configured to control elevating and descending of the lifting device according to a temperature acquired by the temperature acquisition device and preset sintering conditions, wherein, the preset sintering conditions include: a sintering temperature, a heating rate, and a holding time; and
 a spacer, disposed at a first end of the lifting device, wherein there is a first space between the spacer and the sample stage, when the rapid sintering system is in a loading or unloading work state, the furnace mouth is blocked by the spacer, wherein the first end is an end of the lifting device adjacent to the sample stage.

2. The rapid sintering system according to claim 1, wherein the spacer comprises: a plug and a support rod, a lower end portion of the support rod is fixedly coupled to the lifting device, an upper end portion of the support rod is fixedly coupled to the plug, and the furnace mouth is blocked by the plug of the spacer.

3. The rapid sintering system according to claim 1, wherein the spacer is a structure made of high temperature resistant materials.

4. The rapid sintering system according to claim 1, wherein the temperature acquisition device is: a thermocouple, a semiconductor thermometer or a solid thermometer.

5. The rapid sintering system according to claim 1, wherein the control device is: a single board computer, a single chip computer or a computer.

6. The rapid sintering system according to claim 1, wherein the spacer is a structure made of alumina ceramic fiber or a structure made of polycrystalline mullite fiber.

7. A rapid sintering method performed by using the rapid sintering system according to claim 1, comprising:
 (a) disposing a sample to be sintered on the sample stage, when the temperature in the hearth reaches a highest temperature required for sintering the sample to be sintered;
 (b) acquiring a temperature at the sample to be sintered in real time as a real-time sintering temperature by the temperature acquisition device, and feeding back the real-time sintering temperature to the control device, wherein the sample to be sintered is disposed at the sample stage; and
 (c) controlling the elevating and descending of the lifting device by the control device according to the preset sintering conditions obtained in advance and the real-time sintering temperature, so that the real-time sintering temperature of the sample to be sintered is consistent with the preset sintering conditions, and completing the sintering of the sample to be sintered, wherein the preset sintering conditions include: a sintering temperature, a heating rate, and a holding time.

8. The rapid sintering method according to claim 7, wherein the step (a) comprises:
 maintaining the temperature in the hearth constant, when the temperature in the hearth reaches a highest temperature required for sintering the sample to be sintered; and
 disposing the sample to be sintered on the sample stage.

9. The rapid sintering method according to claim 7, wherein the step (c) comprises:
 (c1) determining a temperature curve required for sintering the sample to be sintered as a preset temperature curve according to the preset sintering conditions obtained in advance; and
 (c2) controlling the elevating and descending of the lifting device by the control device according to the preset sintering conditions and the real-time sintering temperature, so that the temperature curve of the real-time sintering temperature is consistent with the preset temperature curve, and completing the sintering of the sample to be sintered.

10. The rapid sintering method according to claim 9, wherein the step (c2) comprises:
 determining a processing time slot by the control device, wherein the processing time slot is a preset unit time for elevating and descending the lifting device;
 comparing the real-time sintering temperature with the preset temperature curve by the control device during the sintering process to determine a required temperature at the sample to be sintered at the end of the processing time slot, and setting the required temperature at the sample to be sintered as a target temperature; and controlling the elevating and descending of the lifting device by the control device, so that the temperature at the sample to be sintered reaches the target temperature after the processing time slot, and maintaining the target temperature until sintering is completed.

\* \* \* \* \*